United States Patent
Wu et al.

(10) Patent No.: US 8,135,674 B2
(45) Date of Patent: Mar. 13, 2012

(54) PROVIDING A SIMULATED DYNAMIC IMAGE OF A FILE SYSTEM

(75) Inventors: Stephen Wu, Rancho Cordova, CA (US); John Edwards, Sunnyvale, CA (US); Sreelatha Sunkara Reddy, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/986,773

(22) Filed: Jan. 7, 2011

(65) Prior Publication Data

US 2011/0106764 A1    May 5, 2011

Related U.S. Application Data

(63) Continuation of application No. 11/871,911, filed on Oct. 12, 2007, now Pat. No. 7,877,357.

(51) Int. Cl.
*G06F 7/00* (2006.01)
*G06F 17/00* (2006.01)
(52) U.S. Cl. .......................... 707/639; 707/704
(58) Field of Classification Search .................. 707/704, 707/639
See application file for complete search history.

(56) References Cited

U.S. PATENT DOCUMENTS

| 7,272,619 B1 * | 9/2007 | Lanzatella et al. ................. 1/1 |
| 2003/0187883 A1 * | 10/2003 | Zelenka et al. ............... 707/201 |
| 2008/0256311 A1 * | 10/2008 | Lee .............................. 711/162 |

OTHER PUBLICATIONS

U.S. Appl. No. 11/871,911, filing date Oct. 12, 2007, Wu.

* cited by examiner

*Primary Examiner* — Cam Truong
(74) *Attorney, Agent, or Firm* — Stattler-Suh PC (57) ABSTRACT

Embodiments described herein adapt static-image and clone technology to provide a simulated dynamic image to an application requesting a dynamic image. A storage system is configured to backup its file system by taking a first static image of the file system at a point in time. A clone of the first image may then be produced, the clone containing any subsequent changes to the file system and a reference pointer to the first image. A second static image of the clone is then produced. An application may request, from the storage system, an image of the file system. In response, the second static image may be presented to the application as a simulated dynamic image.

9 Claims, 7 Drawing Sheets

PROVIDING A SIMULATED DYNAMIC IMAGE OF A FILE SYSTEM

RELATED APPLICATIONS

This patent application claims benefit to and is a continuation of the U.S. patent application entitled "PROVIDING A SIMULATED DYNAMIC IMAGE OF A FILE SYSTEM," having Ser. No. 11/871,911, filed on Oct. 12, 2007 now U.S. Pat. No. 7,877,357.

FIELD OF THE INVENTION

Embodiments of the present invention relate to storage systems, and to providing a simulated dynamic image of a file system for a storage system.

BACKGROUND

A storage system is a processing system adapted to store and retrieve information/data on storage devices, such as disks. The storage system includes a storage operating system that implements a file system to logically organize the information as a hierarchical structure of directories and files on the disks. Each "on-disk" file may be implemented as a set of disk blocks configured to store information, such as text, whereas each directory may be implemented as a specially-formatted file in which information about other files and directories are stored.

The storage operating system generally refers to the computer-executable code operable on a storage system that manages data access and access requests and may implement file system semantics in implementations involving storage systems. In this sense, the Data ONTAP® storage operating system, available from Network Appliance, Inc. of Sunnyvale, Calif., which implements a Write Anywhere File Layout (WAFL®) file system, is an example of such a storage operating system implemented as a microkernel within an overall protocol stack and associated disk storage. The storage operating system can also be implemented as an application program operating over a general-purpose operating system, such as UNIX® or Windows®, or as a general-purpose operating system with configurable functionality, which is configured for storage applications as described herein.

A storage system's disk storage is typically implemented as one or more storage volumes that comprise physical storage disks, defining an overall logical arrangement of storage space. Available storage system implementations can serve a large number of discrete volumes such as 150 or more, for example. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace. As used herein, a volume is said to be "in use" when it is loaded in a storage system's memory and at least one user, application, etc., has mounted the volume and modified its contents.

A storage system may be configured to allow clients to access files stored on a storage system. In this model, the client may comprise an application executing on a computer that "connects" to the storage system over a computer network, such as a point-to-point link, shared local area network (LAN), wide area network (WAN), or virtual private network (VPN) implemented over a public network such as the Internet. Communications between the storage system and its clients are typically embodied as packets sent over the computer network. Each client may request the services of the storage system by issuing file-system protocol messages formatted in accordance with a conventional file-system protocol, such as the Common Internet File System (CIFS), Network File System (NFS) protocol, Fibre Channel Protocol (FCP), Internet Small Computer System Interface (iSCSI), or Storage Area Network (SAN) access.

A storage system may be used to implement a backup and/or restore of its file system, such as a backup and/or restore of one or more files of the file system, a subset of the file system, or the entire file system. A backup usually comprises one or more images of the file system or a portion thereof. Each image captures a state of the file system at a selected point in time. The images provide a convenient format for the storage and/or retrieval of several backups of the file system over time, such as for an archive or chronology of backups. Despite the advantages of image-based backups, a conventional backup consumes significant amounts of time and resources of the storage system. For instance, it requires intensive input/output operations of the storage system and requires significant storage space. However, backing up, archiving, and/or restoring the files of a file system are essential to maintaining a file system and its data.

Traditionally, the images generated by some storage systems are static or read-only from the moment of generation. This has benefits in terms of the fixed integrity of the imaged and/or stored data. Some applications, however, may require and request, from the storage system, dynamic images (i.e., images having read-write capability). Accordingly, there is a need for a method of adapting the static image technology implemented by some storage systems to provide a dynamic image, to an application requiring a dynamic image.

SUMMARY

Embodiments of the invention described herein adapt static image technology implemented by a storage system to provide a simulated dynamic image to an application requesting a dynamic image. In some embodiments, the storage system implements a file system and is configured to backup the file system by taking a static image (read-only image) of the state of the file system at a point in time. The storage system may be accessed by a server system that executes an application (e.g., backup, archive, or recovery application) that requests, from the storage system, a dynamic image for the file system of the storage system. Upon receiving a request for a dynamic image, the static image (read-only image) of the file system (generated by the storage system) may be manipulated to produce a simulated dynamic image (read-write image) that is presented to the application. By doing so, compatibility between a storage system implementing static image technology and an application requesting a dynamic image is provided without requiring extensive re-configuration of the storage system and/or application.

In some embodiments, when an application requests a dynamic image for a storage object of a storage system (e.g., a part of a file system of the storage system), static image technology may be combined with clone technology to provide a simulated dynamic image to the application. Static image technology may provide a static/read-only image of the file system. When changes are subsequently made to the file system, clone technology may be used to produce a clone of the file system that leverages the prior-generated static image. The clone may capture any changes in the file system (since the point in time that the static image was generated), while also including the data captured in the static image through use of a reference to the static image. As such, a clone may provide read-write capability to capture changes in the file system while also being relatively small in data size (since a clone contains data reflecting only changes in the file system and a reference to a static image for their underlying data).

Since producing a static image of a file system may require intensive input/output operations of the storage system and significant storage space, it is advantageous to use clone technology to capture small changes in the file system rather than continually producing new static images of the file system whenever changes are made to the file system. However, a clone is typically not presentable to an application requesting an image of a file system since the application is requesting and expecting an image file. In some embodiments, when an application requests a dynamic image of a file system, a static image of a clone is then produced and provided to the application, the static image of the clone (having read-write capability) providing a simulated dynamic image to the application.

In some embodiments, to provide a simulated dynamic image for a file system, a first image of the file system may be generated, the first image comprising a static/read-only image of the file system. The first image is sometimes referred to herein as the base/backing image of the file system as it typically contains a large amount of information regarding the file system and is used as the base of information for subsequent clones and static images (that may only reflect changes to the file system since the first image was generated). These embodiments then generate a first clone for the file system, the first clone containing a reference to the first/base image for its underlying base data. The first clone may include read-write capability and may be alterable. As such, the first clone may also include data reflecting changes/differences in the file system since the point in time that the first image was generated.

A second static image may then be generated. The second image comprises an image of the first clone. As such, the second image comprises an image that contains a reference to the first image for its underlying base data as well as any changes to the file system since the first image was generated. When an application makes a request for a dynamic image of the file system, the second static image may then be presented to the application. The second static image provides a simulated dynamic image of the file system through the read-write functionality of the first clone (which captures changes to the file system since the first image was generated) and the reference to the first/base image for its underlying data. The reference (contained in the second image) to the first image may then be used to retrieve data of the first image. In other embodiments, the first and second static images may be presented to the application, the first and second static images providing a simulated dynamic image to the application.

The process may be repeated whereby more clones and static images are produced. For example, a second clone may be produced that captures changes made to the file system since the first image was generated. When an application makes a request for an image of the file system, a third static image may be generated, the third image comprising an image of the second clone. As such, the third image comprises an image that contains a reference to the first image for its underlying base data as well as any changes to the file system since the first image was generated. The third static image may then be presented to the application, the third static image providing a simulated dynamic image to the application. Hence, the generation of static images and clones may be used to capture a part of the file system, and changes thereto, in a read-write manner.

Implementations of the foregoing may be embodied in a server system that accesses the storage system and includes various components that interact for generating, storing, and/or retrieving images. For instance, the server of some implementations includes an operating system, one or more server or host applications, a backup framework engine, a backup management engine, and a local storage. At various times, components of the server, such as the applications, the operating system, and/or the backup framework may request images of a file system (or portion thereof) of the storage system. The requests may be part of backup and/or recovery processes and may be for dynamic and/or static images. In some embodiments, the requests are serviced by the backup management engine. The backup management engine preferably employs one or more modules in conjunction with the storage system, to generate, manage, store, and/or retrieve images to service the requests relating to backup and/or recovery. For instance, the backup management engine may include a backup module that is used for generating and selectively deleting images, clones, and images of clones. Further, the backup management engine may store and/or retrieve the images and/or clones by using requests to the storage system.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The disclosure of U.S. patent application entitled "PROVIDING A SIMULATED DYNAMIC IMAGE OF A FILE SYSTEM," having Ser. No. 11/871,911, filed on Oct. 12, 2007, is expressly incorporated herein by reference.

In the following description, numerous details and alternatives are set forth for purpose of explanation. However, one of ordinary skill in the art will realize that the invention can be practiced without the use of these specific details. In other instances, well-known structures and devices are shown in block diagram form to not obscure the description of the invention with unnecessary detail. The embodiments described below include mechanisms for copying, capturing, archiving, and/or restoring a storage object of the storage system, such as part of the file system (i.e., the entire file system or a portion of the file system), one or more disks, one or more drives, one or more volumes, one or more logical units (logical unit numbers, or LUNs), one or more virtual disks, etc. Although some embodiments are applied and described in relation to a file system or a logical unit, other embodiments may be applied to other storage objects of the storage system. Other aspects of the invention will become apparent from the following detailed description taken in conjunction with the accompanying drawings, which illustrate various embodiments by way of example.

System Architecture

Figure 1:
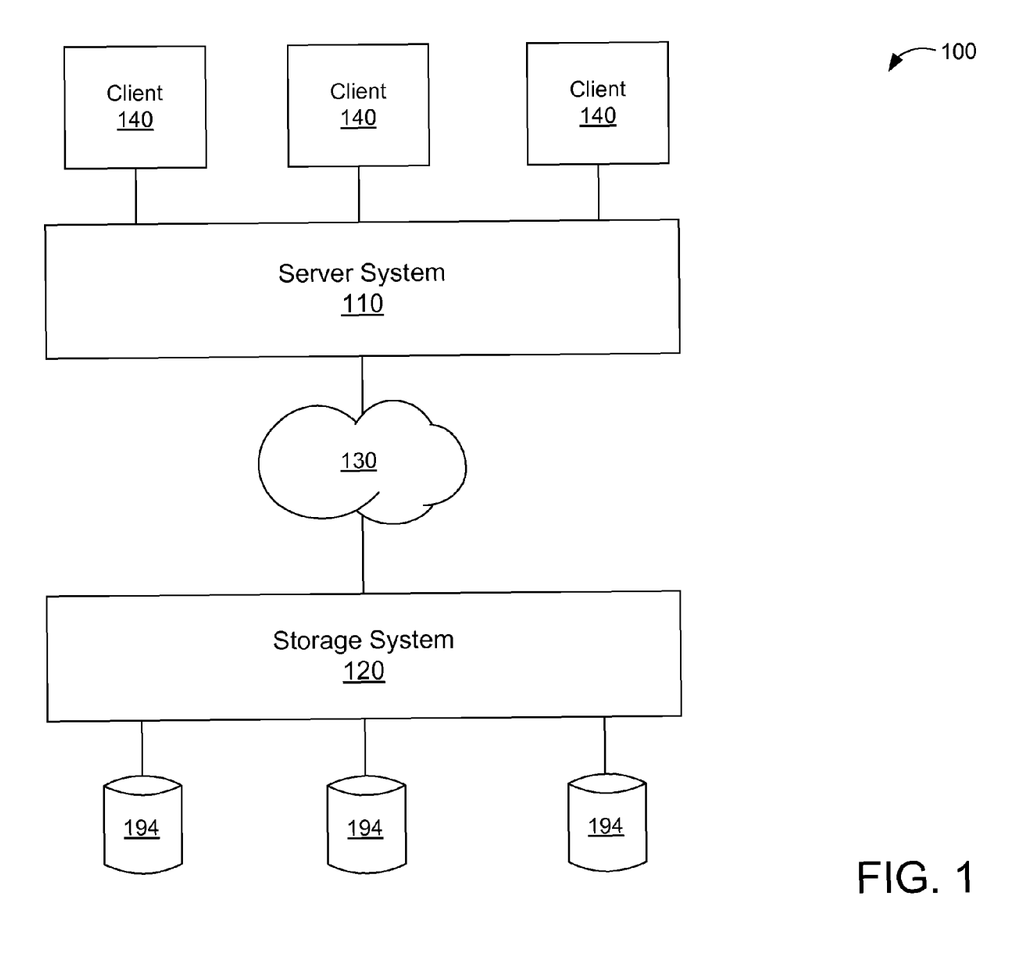
FIG. 1 is a schematic block diagram of an exemplary storage system environment in which some embodiments operate.

FIG. 1 is a schematic block diagram of an exemplary storage system environment 100 in which some embodiments operate. The environment 100 comprises a server system 110 connected to multiple client computers 140 via a network. The environment 100 further comprises a storage system 120 having a set of mass storage devices 194 providing a set of storage volumes connected to the server system 110 via a connection system 130.

The server system 110 is a computer that handles requests for data, electronic mail, file transfers, or other network services from client computers 140. The server system 110 can be connected to clients 140 over a network, such as a Local Area Network (LAN), Wide Area Network (WAN), or the like. The server system 110 may execute applications including host applications, such as backup and/or recovery type applications. Accordingly, the server system 110 provides support for host applications to various clients such as the clients 140 coupled to the server system 110. The various clients 140 access the information on the data system by using client applications.

The server system 110 utilizes services of the storage system 120 to store and manage information in a set of mass storage devices 194. Interaction between the server system 110 and the storage system 120 can enable the provision of storage services. That is, the server system 110 may request the services of the storage system 120, and the storage system 120 may return the results of the services requested by the server system 110, by exchanging packets over the connection system 130. The server system 110 may issue packets using file-based access protocols, such as the Common Internet File System (CIFS) protocol or Network File System (NFS) protocol, over the Transmission Control Protocol/Internet Protocol (TCP/IP), when accessing information in the form of files and directories. Alternatively, the server system 110 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. The storage system 120 is coupled locally to the server system 110 over the connection system 130, such as a local area network (LAN), a wide area network (WAN), metropolitan are network (MAN), or the Internet.

As described herein, the storage system 120 stores data in a set of mass storage devices 194, preferably on one or more writable storage device media such as magnetic disks, video tape, optical, DVD, magnetic tape, and any other similar media adapted to store information, including data and parity information. For illustrative purposes, however, as described herein, the data is stored on devices 194. The devices 194 within a volume are typically organized as one or more groups of Redundant Array of Independent (or Inexpensive) Disks (RAID). The server system 110 utilizes services of the storage system 120 to store and manage data in a set of mass storage devices 194 that provide a set of storage volumes. As known in the art, a file system implemented on the storage devices 194 may provide multiple directories in a single volume, each directory containing zero or more filenames. A file system provides a logical/virtual representation of how data (files) are organized on a volume, where data (files) are represented as filenames that are organized in one or more directories. Examples of common file systems include New Technology File System (NTFS), File Allocation Table (FAT), Hierarchical File System (HFS), Universal Disk Format (UDF), UNIX® file system, and the like.

Figure 2A:
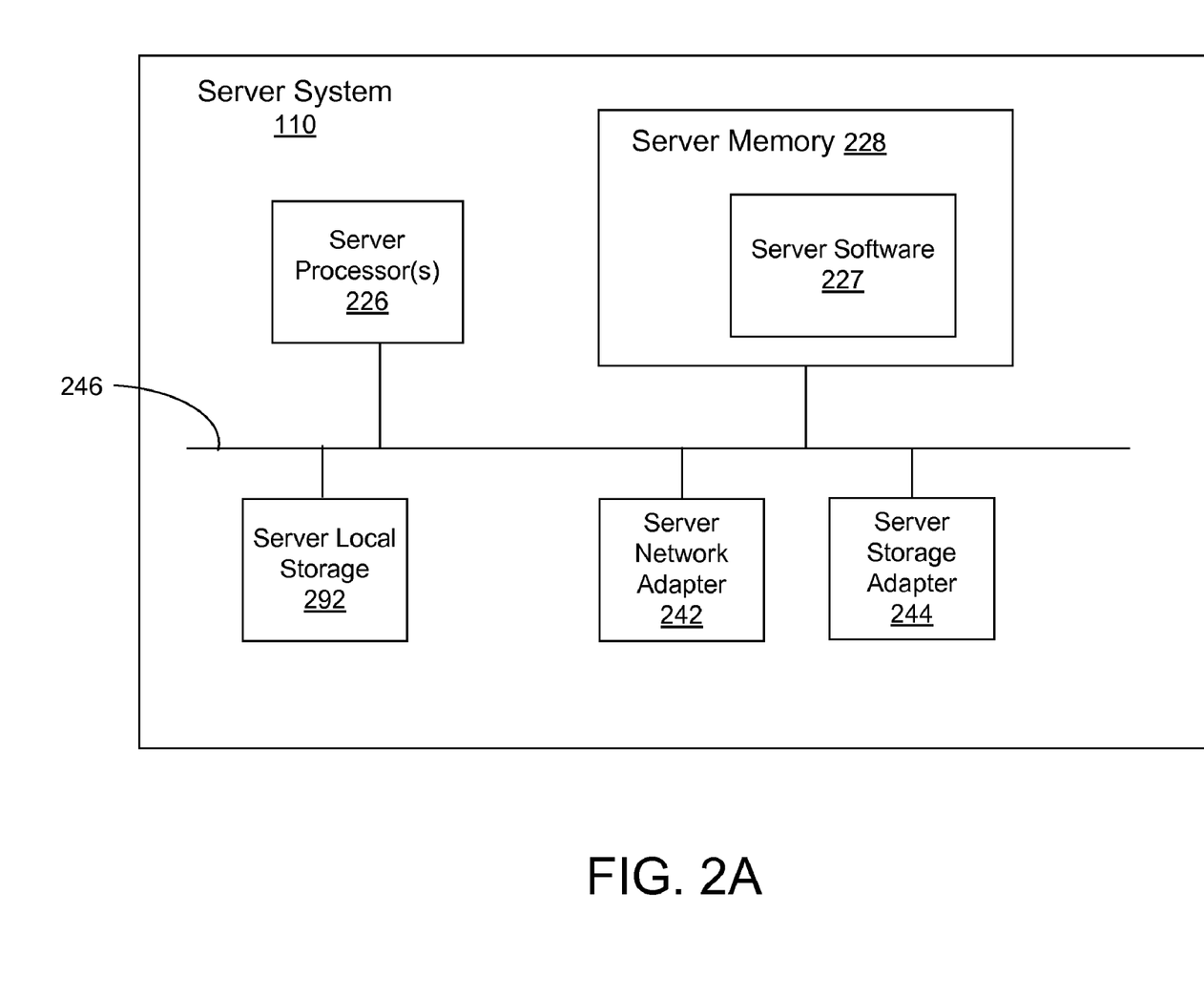
FIG. 2A is a schematic block diagram of an exemplary server system that may be employed in the storage system environment of FIG. 1.

FIG. 2A is a schematic block diagram of an exemplary server system 110 that may be employed in the storage system environment of FIG. 1. The server system 110 comprises server processor(s) 226, server memory 228, a server network adapter 242, a server storage adapter 244, and a server local storage 292 coupled by a bus 246.

The server processors 226 are the central processing units (CPUs) of the server system 110 and, thus, control the overall operation of the server system 110. In certain embodiments, the server processors 226 accomplish this by executing software, such as that described in more detail herein. The server processors 226 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The server memory 228 comprises storage locations that are addressable by the processor 226 and adapters, for example, a server network adapter 242 and a server storage adapter 244. The storage locations are for storing software program code that preferably includes the server software 227 and associated database structures. The server processor 226 and the server adapters may, in turn, comprise processing elements and/or logic circuitry configured to execute the software code and manipulate various data structures. The server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The server network adapter 242 comprises a plurality of ports adapted to couple the server system 110 to one or more clients 140 (shown in FIG. 1) over point-to-point links, wide area networks, virtual private networks implemented over a public network (Internet) or a shared local area network. The server network adapter 242 thus may comprise the mechanical, electrical and signaling circuitry needed to connect the node to the network.

The server storage adapter 244 cooperates with the server operating system 224 that executes on the server system 110 to access information such as data and transaction files from the devices 194 (shown in FIG. 1). The server storage adapter 244 comprises a plurality of ports having input/output (I/O) interface circuitry that couples to the devices 194 over an I/O interconnect arrangement, such as a conventional high-performance, fibre channel (FC) link topology. The server local storage 292 is a device that stores information within the server system 110, such as the server software 227, the server operating system 224, and data. The server system 110 loads the server software 227 into the server memory 228 from which they are accessed by the server processors 226.

Figure 2B:
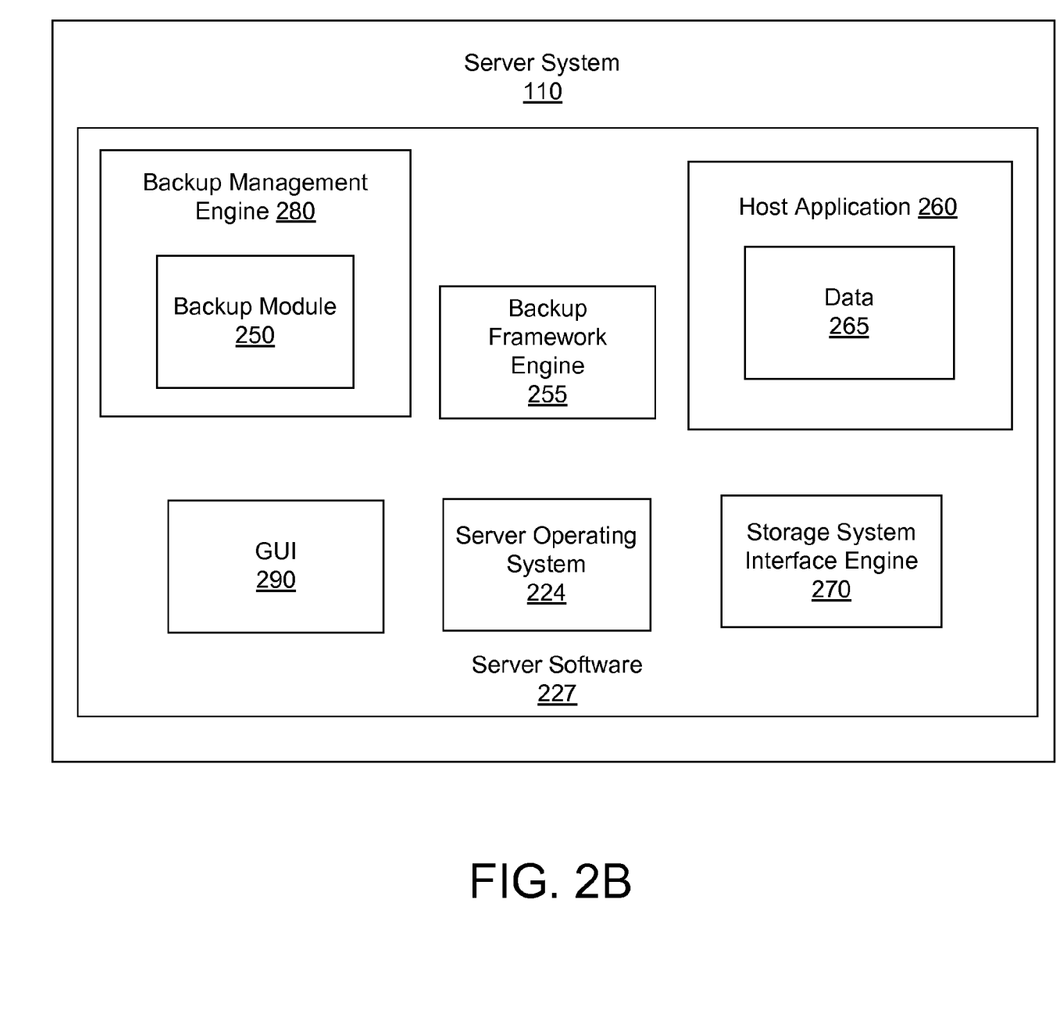
FIG. 2B shows a conceptual diagram of exemplary application and data components that may be employed in the server system of FIG. 2A.

FIG. 2B shows a conceptual diagram of exemplary application and data components that may be employed in the server system 110 of FIG. 2A. In some embodiments, the server system 110 executes the following software: one or more host application(s) 260, which may use data 265 or a database; a backup management engine 280, having a backup module 250; a user interface engine 290; a storage system interface engine 270; a backup framework engine 255; and/or a server operating system 224. The server operating system 224 is a program that, after being initially loaded into the server memory 228, manages host applications executed on the server system 110. The server operating system 224 can be, for example, UNIX®, Windows NT®, Linux®, or another operating system. In one embodiment, the various engines are implemented as modules. As used herein, the term "module" refers to computer program code adapted to provide the functionality attributed to the module upon execution by a processor. For instance, the backup module 250 is used in some embodiments for generating images of a file system, or portions thereof.

The host application(s) 260 can be, for example, a recovery type application that implements the backup module 250, to provide dynamic and/or static type images for recovery of one or more files of the files system. In some cases, the host applications 260 may request dynamic images that include read and write capability, and the backup module 250 is preferably configured to generate and/or provide the images.

The storage system 120 preferably interacts with the file system to perform a backup and/or recovery for the file system. As mentioned above, the backup may be for the entire file system or a portion of the file system (e.g., a single file, multiple files, a drive, a disk, multiple drives or disks, and/or one or more volumes including multiple drives). As used herein, a "part of the file system" refers to the entire file system or a portion of the file system. In some cases, the backup management engine 280 causes the storage system 120 to backup all or a portion of the file system. In some embodiments, the backup management engine 280 comprises an image module that causes the storage system 120 to backup all or a portion of the file system by using image taking technology (e.g., Snapshot™ technology provided by Network Appliance of Sunnyvale, Calif.). A snapshot is a persistent point in time (PPT) image of the active file system that enables quick recovery of data after data has been corrupted, lost, or altered. Snapshots can be created by copying the data at each predetermined point in time to form a consistent image, or virtually by using a pointer to form the image of the data. In some embodiments, the backup management engine 280 also comprises a clone module that implements clone technology (e.g., Flexclone™ technology provided by Network Appliance, Inc.) that is used in conjunction with the image module to provide a simulated dynamic image. The Snapshot™ and Flexclone™ technology of some embodiments is described further in U.S. patent application Ser. No. 10/836,112 entitled Writable Clone of Read-only Volume, filed Apr. 30, 2004, by Robert L. Fair and John K. Edwards, (assignee Network Appliance, Inc., Sunnyvale, Calf.), which is incorporated herein by reference.

More specifically, the backup module 250 of the backup management engine 280 may cause the storage system 120 to perform one or more backup services. For each backup, the backup management engine 280 may also cause the storage system 120 to generate backup information that is stored to the storage system 120. The backup information may be in the form of metadata, and may include information about a backup, for example, identification for the backup, a time stamp when the backup was performed, and filenames, directory locations on the storage device(s) 194, and/or the directory path where backups are stored. The backup information may be used later to restore the file system and/or portions thereof, for instance, in case of a system crash, data corruption, virus, or a similar occurrence. Backups may be performed on a regular schedule, for example, every two days. Alternatively, backups may be invoked by a system administrator who may submit a backup request via a user interface provided by the GUI engine 290. In some embodiments, a backup may be performed by using the backup management engine 280, which may preferably comprise a SnapManager® program provided by Network Appliance, Inc., of Sunnyvale, Calif.

The storage system interface engine 270 may be configured to act as an interface between the server system 110 and the storage system 120. The storage system interface engine 270 communicates with the storage system 120 by using, for example, a Zephyr Application and Programming Interface (ZAPI) protocol. In particular, the storage system interface engine 270 interacts with the backup management engine 280 to receive and perform requests made by the backup management engine 280 by interacting with other software programs of the server system 110 or the storage system 120. In some embodiments, the storage system interface engine 270 comprises a SnapDrive® program provided by Network Appliance, Inc., of Sunnyvale, Calif. Further, a backup framework engine 255 may also be used to help implement backup functions. More specifically, the backup framework engine 255 may be used to help integrate the various backup components of the host application 260, the backup management engine 280, and/or the storage system interface engine 270. The backup framework engine 255 may interact with these various components to produce the backup. In some embodiments, the backup framework engine 255 comprises the volume shadow service (VSS), a software product provided by Microsoft Corp. of Redmond, Wash.

As will be described herein by reference to FIG. 3, after the backup-management-engine 280 initiates a backup of a file and/or file system (e.g., by sending a command to the storage system 120 via the storage system user interface engine 270 and the backup framework engine 255), the storage operating system 330 of the storage system 120 (shown in FIG. 3) generates one or more images relating to the file system, and generates backup information describing the backup. After the backup is performed, the storage operating system 330 sends a signal to the backup management engine 280 that the backup operation is completed. In some embodiments, a restore operation is later performed by using the generated images, and/or the backup information.

Storage System

Figure 3:
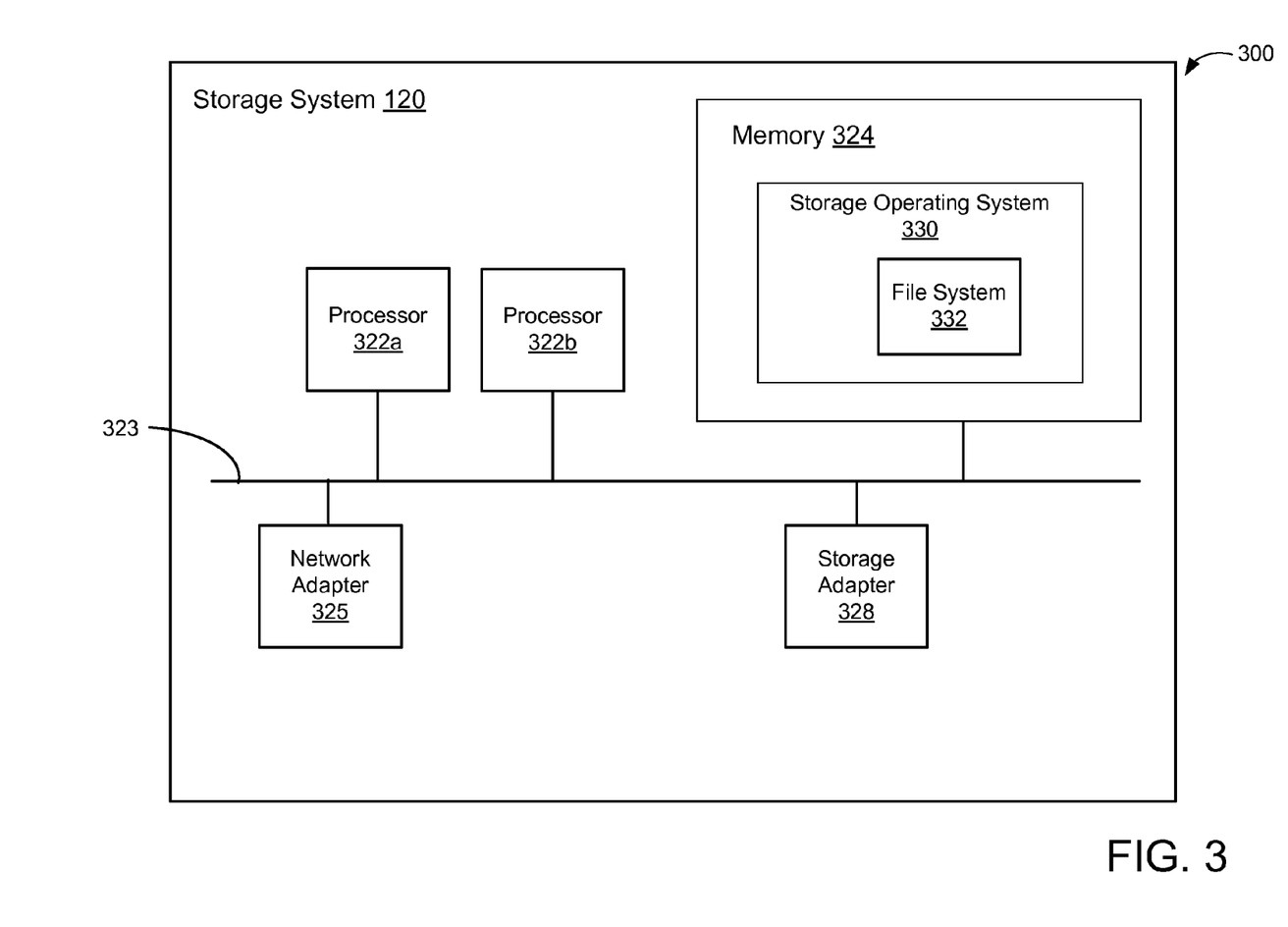
FIG. 3 is a diagram illustrating various components of the storage system, in accordance with some embodiments.

FIG. 3 illustrates various components of the storage system 120, in accordance with some embodiments. Specifically, the storage system comprises one or more processors 322a and/or 322b, a memory 324, a network adapter 325, and a storage adapter 328 interconnected by a system bus 323. The storage system 120 executes a storage operating system 330 that implements a file system 332. The memory 324 comprises storage locations that are addressable by the processors and adapters for storing software program code and data structures. The processor and adapters may, in turn, comprise processing elements and/or logic circuitry configured to execute the software code and manipulate various data structures. The network adapter 325 comprises a plurality of ports adapted to couple the storage system 120 to one or more server systems 110 over point-to-point links, wide area networks, virtual private networks implemented over a public network (Internet), or a shared local area network. The network adapter 325 thus may comprise mechanical, electrical and signaling circuitry. The storage adapter 328 cooperates with the storage operating system 300 to access information requested by the server system 110. The storage adapter 328 comprises a plurality of ports having input/output (I/O) interface circuitry that couples to the disks over an I/O interconnect arrangement, such as a conventional high-performance, FC link topology.

The storage operating system 330, portions of which are typically resident in memory 324 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein. As illustrated, the storage operating system 330 may comprise the Data ONTAP® operating system available from Network Appliance Inc., of Sunnyvale, Calif. (NetApp®), that implements a Write Anywhere File Layout (WAFL®) file system. However, it is expressly contemplated that any appropriate file system may be enhanced for use in accordance with the inventive principles described herein. As such, where the term "WAFL" is employed, it should be taken broadly to refer to any file system that is otherwise adaptable to the teachings of this invention. As used herein, the term "storage operating system" generally refers to the computer-executable code operable on a computer that manages data access.

The storage operating system 330 may implement a file system 332 for a storage volume on a storage device 194. A file system may provide multiple directories in a single storage volume, each directory containing zero or more filenames. A file system provides a logical/virtual representation of how data files are organized on a volume, where data files are represented as filenames that are organized in one or more directories. As used herein, the term "file" indicates a container or any other storage entity that contains a group of related data. When the file system generates a file, it typically selects a filename for the file and stores the filename in a designated directory.

Preferably, a backup of a file or a file system includes the copying and storage of a directory and/or tree structure of the file system. In some embodiments, the backup module 250 of the backup management engine 280 performs one or more backup services and/or functions. After the backup management engine 280 performs a backup, the backup management engine 280 sends a signal to the host application indicating that a backup has been successfully completed. The various software components executing on the server system 110 interact with the storage system 120 that stores backup information, images, and/or files on one or more volumes of a set of storage device 194. The storage system 120 implements one or more file systems that provide a logical representation of files as organized on one or more volumes and as represented as filenames in one or more directories. The backup process backs up the file system by copying and storing backup files. The backup process may do so by taking an image copy (e.g., a persistent point in time Snapshot™ image) of a part of the file system and storing the image copy to a location. The image(s) may be used later during a restore process. During backup and/or image generation (e.g., using Snapshot™ capture), operations on the file system (such as write operations in particular) may be suspended. After the backup is performed, the backup process allows write operations to resume on the file system.

In some embodiments, the backup process produces backup information that may include metadata that is stored to the storage system 120. The backup information includes information describing the backup performed on the file system (e.g., a time stamp, filenames, and/or location information). The backup information and images may be used later to restore the imaged file system or a portion thereof. For some implementations, the backup information and/or images are used by the backup management engine 280 to perform a "restore" for the file system. A restore may be performed for a variety of reasons. For example, a restore may be performed when an error occurs in the file system, in an application, in the server or storage operating system, or in the other applications that causes a "crash" and reboot of the server system or the storage system. A restore may be performed when data in the file system have been undesirably altered, corrupted, and/or deleted, for example, by a computer virus or other malignant code. If a file has undesirably become altered, corrupted, and/or deleted, it is advantageously restored by copying and/or replacing it by using a previously stored image thereof. Copying and replacing files may require significant disk space consumption of the storage system as well as increasing server system and storage system workload. Embodiments described herein may reduce the storage required for generated images.

The restore process is implemented by software or hardware configured to restore part of the file system. In some embodiments, the steps are performed by various software components executing on the server system 110. For example, in some embodiments, the backup management engine 280 restores part of the file system by using the storage system interface engine 270 and/or the backup framework engine 255. The various software components executing on the server system 110 interact with the storage system 120 that stores backup information and image(s) on one or more volumes of a set of storage devices 194. The storage system 120 implements one or more file systems that provide a logical representation of files as organized on one or more volumes and as represented as filenames in one or more directories.

The restore process begins when it receives a selection of a part of the file system to be restored, such as when indicated by a system administrator after a "crash" and/or reboot of the server or the storage system, or when data may have become corrupted. The restore process retrieves the backup information and/or image(s) for the part of the file system. The restore process then restores the part of the file system by using the backup information and/or images. The restore process may do so by deleting and replacing files of the file system with files from the backup images. Alternatively, the set of original data files may have been deleted and do not exist and thus are replaced by the retrieved backup information and images.

Some embodiments provide dynamic (i.e., read-writable) image support in generating, managing, and/or storing backup and/or recovery data. These embodiments provide such dynamic image support for file systems that may be configured to generate static images for backup and recovery purposes, the static images being read-only from the moment of creation. However, generation of read-only images by the file system of the storage system may cause incompatibilities with an operating system of a server system that allows for dynamic (read-write) images (such as for an application executing on the server that requests and/or requires dynamic images). Examples of applications that may request dynamic images include backup or restore, applications.

To address this issue, in some embodiments, when an application requests a dynamic image for a storage object (e.g., part of a file system of a storage system), static image technology (e.g., Snapshot™ technology provided by Network Appliance of Sunnyvale, Calif.) may be combined with clone technology (e.g., Flexclone™ technology provided by Network Appliance, Inc.) to provide a simulated dynamic image to the application. Static image technology may provide a first static/read-only image of the file system. Clone technology may be used to produce a clone of the file system that captures any changes in the file system (since the point in time that the static image was generated), while also including the data captured in the static image through use of a reference to the static image. However, a clone is typically not presentable to an application requesting an image of a file system since the application is requesting and expecting an image file. In some embodiments, when an application requests a dynamic image of a file system, a second static image comprising an image of the clone is then generated and provided to the application, the second static image providing a simulated dynamic image to the application. The clone technology of some embodiments is implemented by the storage system.

Methods for Providing Simulated Dynamic Images

Figure 4:
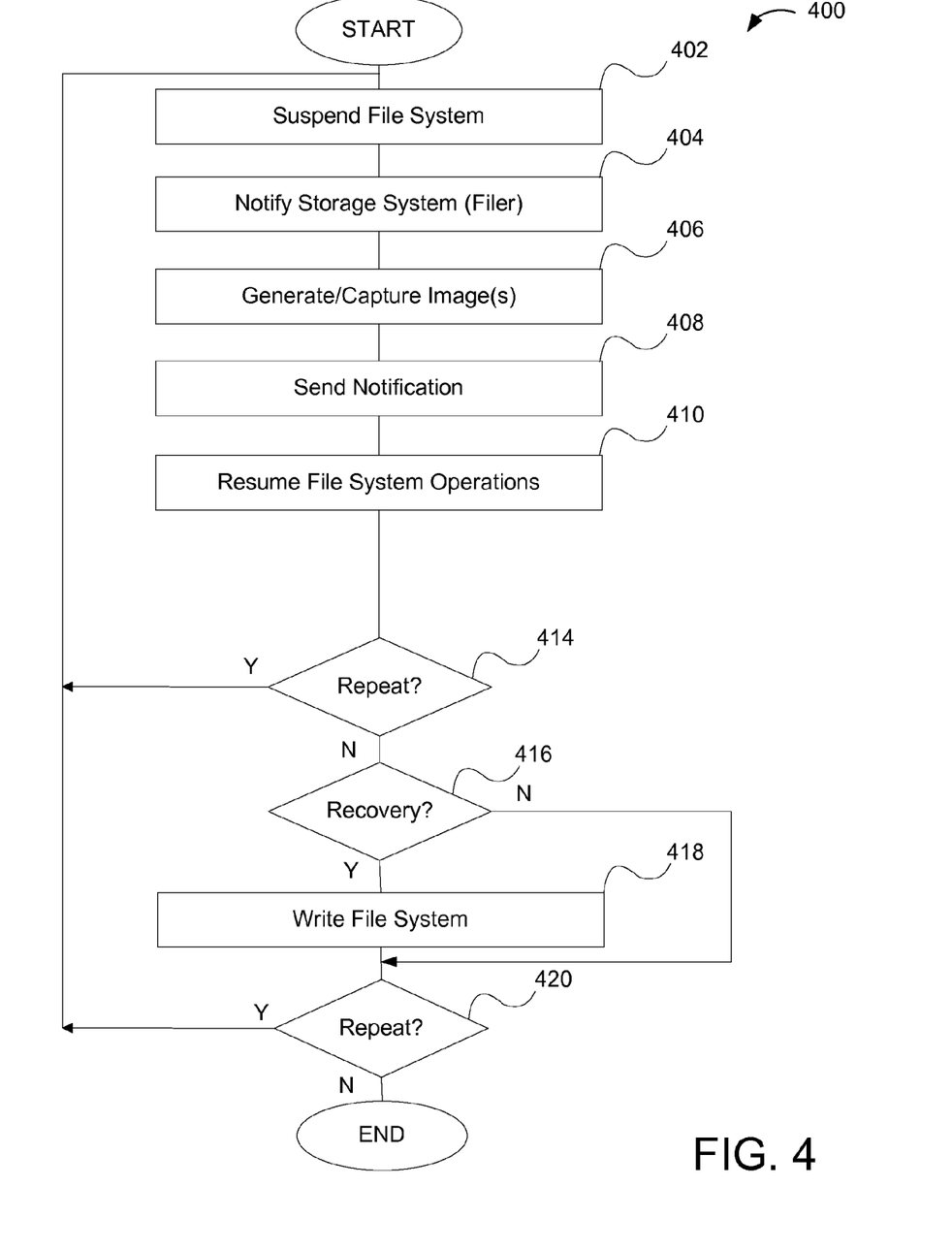
FIG. 4 illustrates an image generation process.

FIG. 4 illustrates an overall process 400 for generating an image of a storage object of a storage system and recovering the storage object using the generated image. Although the embodiments below are described in relation to a storage object comprising a logical unit of a storage system, in other embodiments, other storage objects of the storage system are used. Some of the steps of the method 400 may be performed by various components (e.g., operating system, an application, etc.) of a server system connected to the storage system.

As shown in FIG. 4, the process 400 begins at the step 402, where all operations of a file system of the storage system are suspended for a predetermined allotted period of time (e.g., as determined by an administrator). Then, at step 404, the storage system is notified (e.g., by the operating system of the server) to generate an image of a logical unit of the storage system within the predetermined time period allotted. Once notified, the storage system generates the image of the logical unit, at the step 406. In some embodiments, static image and clone technology are used to provide a simulated dynamic image of the logical unit (as discussed below in relation to FIG. 5).

Due to the limited amount of time the storage system is given to generate the logical unit image (at step 406), the logical unit image often does not capture the complete state of the logical unit. In particular, there may be in progress incomplete transactions upon the logical unit that are suspended and not captured in the logical unit image (since a transaction must be completed before it may be captured in an image). For example, a write operation on the logical unit may be in progress when the logical unit image is created, the write operation being suspended until the logical unit image is completed and thus not being captured in the logical unit image. In some embodiments, such incomplete transactions are completed on the logical unit after the logical unit image is created, where the completed transactions may then comprise changes/differences in the logical unit since the logical unit image was generated. At the step 408, the storage system notifies the operating system of the server system that the image has been generated and the file system operations on the logical unit resume at step 410.

At the step 414, a determination is made whether to repeat steps 402 through 410 to generate further images (e.g., as prompted by an administrator or as requested by an application). If the process 400 should repeat to generate another image, the process 400 returns to the step 402. Otherwise, the process 400 transitions to step 416, where a determination is made whether to perform a recovery of the logical unit (e.g., as prompted by an administrator, occurrence of a crash and reboot of the storage system, corruption of data in the logical unit, as requested by an application, etc.). If a recovery of the logical unit should be performed, then at step 418, the logical unit is recovered/written using the generated logical unit image. If a recovery is not needed at the step 416, then the process 400 transitions to step 420, where a determination is made whether to repeat the process 400 such as, for example, a request by the operating system and/or an application of the server for the generation of additional images. If the process 400 should repeat at the step 420, then the process 400 returns to the step 402. Otherwise, the process 400 ends.

Figure 5:
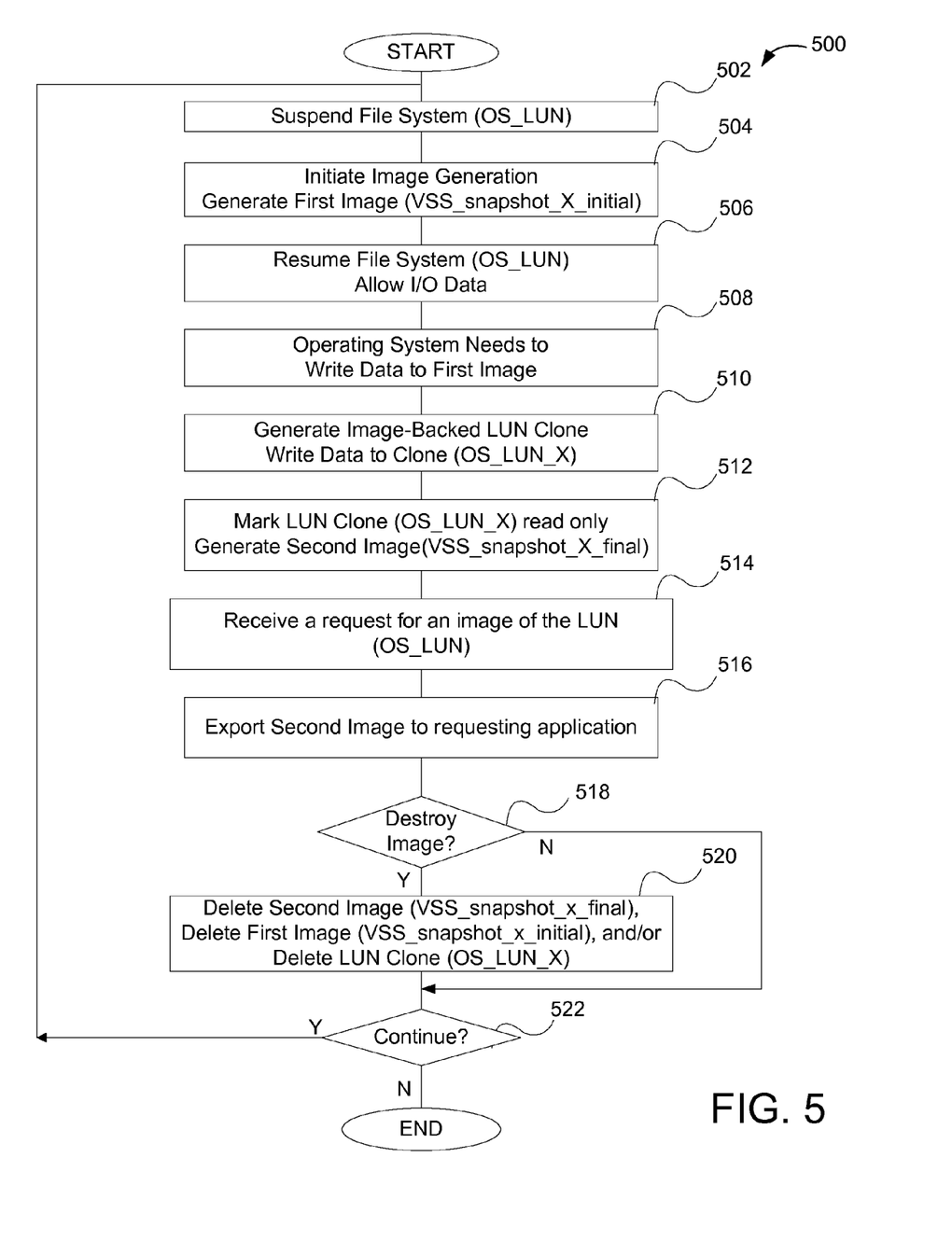
FIG. 5 illustrates an image generation and/or removal process.

In some embodiments, static image and clone technology are used to provide a simulated dynamic image of the logical unit at step 406, where static images and static image-backed clones are produced for storage, archival, and/or recovery purposes. FIG. 5 illustrates a process 500 for generating a simulated dynamic image of a logical unit of a storage system. Although the embodiments below are described in relation to a storage object comprising a logical unit of a storage system, in other embodiments, other storage objects of the storage system are used. Some of the steps of the process 500 may be performed by various components (e.g., operating system, an application, etc.) of a server system connected with the storage system.

As shown in FIG. 5, the process 500 begins at the step 502, where an operating system of the server system suspends/halts file system operations on a logical unit (hereinafter referred to as the OS_LUN). Then, at the step 504, image generation is initiated and a first static image is generated. Some embodiments refer to the generated first image as the "VSS_Snapshot_X_initial." At step 506, the file system operations on logical unit (OS_LUN) are allowed to resume. For instance, input-output of data and/or read-write to the file system may be allowed. As such, resumed file system operations may cause changes to be made to the logical unit after the first image of the logical unit is generated. At step 508, the operating system then requests that new data be written to the first image (VSS_snapshot_X_initial). The new data may reflect changes to the logical unit since the first image of the logical unit was generated. The time before the operating system requests writes to the first image may be unbounded (i.e., has no time limit).

However, the first image of the logical unit comprises a static image that is a read-only image. As such, an image-backed logical unit clone is then generated using clone technology at the step 510, the logical unit clone capturing the new data as well as containing a reference to the first image (VSS_snapshot_X_initial) that comprises its backing image containing its underlying data. The clone technology of some embodiments (e.g., FlexClone™) enables true cloning or instant replication of data volumes and data sets without requiring additional storage space at the time of clone generation. Each cloned volume is a transparent, virtual copy that is used for essential enterprise operations, such as testing and bug fixing, platform and upgrade checks, multiple simulations against large data sets, remote office testing and staging, and market-specific product variations. The clone technology of some embodiments provides substantial space savings with minimal overhead. Examples of such clone technology is further described in the U.S. patent application Ser. No. 11/485,260, entitled Method and System to Make a Read-only File System Appear to be Writeable, filed Jul. 11, 2006 by Boris Teterin and Manish Dhirajlal Patel (assignee Network Appliance, Inc.), which is incorporated herein by reference.

The clone is typically small in data size as it only contains data reflecting changes to the logical unit since the first image was generated and a reference to the first image. Moreover, since the logical unit clone has read-write capability, new data may be written to the logical unit clone. The clone of some embodiments is referred to as OS_LUN_X. After the clone (OS_LUN_X) is produced at the step 510, at step 512, the clone is marked as read-only, which prepares the clone for capture within an image. Then, a second static image is generated which captures the read-only logical unit clone (OS_LUN_X, read-only). Some embodiments refer to the second image as (VSS_snapshot_X_final). As such, the second image comprises a simulated dynamic image since the second image comprises new data reflecting changes to the logical unit since the first image was generated and a reference to the first image.

At the step 514, a request is received from an application for a dynamic image of the logical unit. In some embodiments, a request is received from an application (such as host application 260 executing on the server system) for data stored in an image of the logical unit. In some embodiments, the application comprises a recovery application requesting the image of the logical unit for recovery of the logical unit. At step 516, the second static image is exported to the requesting application (e.g., for use in recovery of the logical unit). The logical unit may then be reconstructed by extracting the first clone from the second static image and retrieving the first static image from the first clone (using the reference to the first static image in the first clone).

Then, at the step 518, a determination is made whether to destroy one or more generated images or clones. The determination may be based on a request from an application and/or the operating system executing on the server system connected with the storage system. Alternatively, the determination may be based on whether the image is useful, or contains new and/or changed data. If the generated image(s) should be destroyed, at step 520, the second image (VSS_Snapshot_X_final) is deleted. Optionally, the first image (VSS_Snapshot_X_initial) may also be deleted, and the process 500 transitions to the step 522. In some embodiments, the logical unit clone (OS_LUN_X) is determined to be no longer needed and/or is selected for deletion and the logical unit clone is deleted. When an image or clone is deleted, any dependencies between the image and clone are removed to allow the deletion (as discussed below). If, at the step 518, it is determined that no images or clones should be destroyed, the process 500 transitions to the step 522, where a determination is made whether to continue the process 500 at step 502. If so, the process continues at step 502. Otherwise, the process 500 ends.

Figure 6:
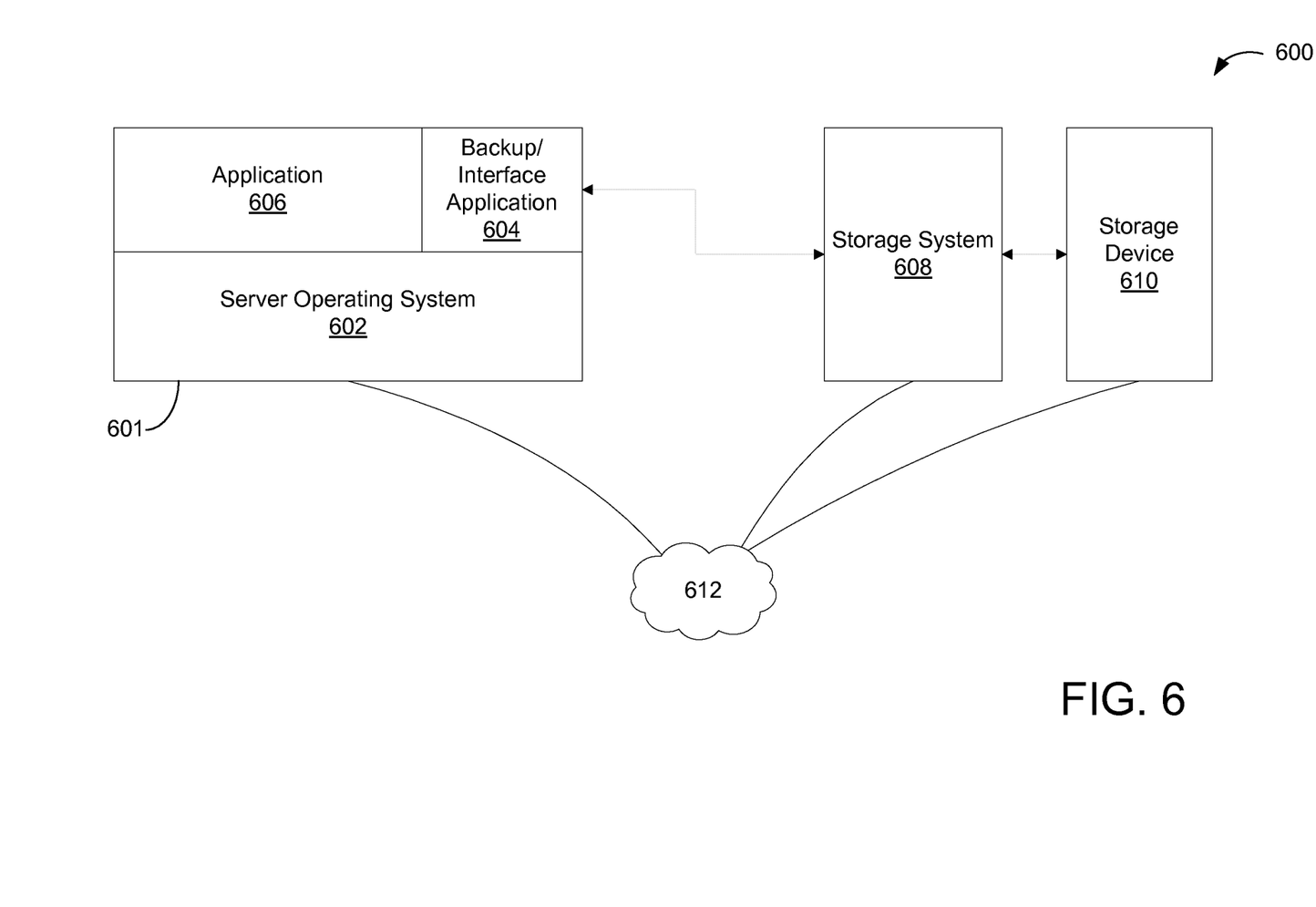
FIG. 6 illustrates a system for taking, capturing, storing, and/or retrieving images.

FIG. 6 illustrates a system 600 that may be implemented in conjunction with some embodiments. The system 600 includes a server 601 (such as, for example, the server system 110 of FIG. 1) that has an operating system 602 and various applications 604 and 606 (such as the applications for the clients 140 and/or the server system 110 of FIG. 1) that run on the operating system 602. The system 600 further includes a storage system 608, and an optional storage or vault device 610. The server 601, storage system 608, and vault 610 (e.g., a mass or persistent storage device) may be coupled in various ways. For instance, they are optionally coupled by using a network 612, or directly, and/or some combination thereof. In some embodiments, the application 604 may comprise a SnapDrive™ application or module, the storage system 608 may execute Data ONTAP® operating system, and/or the vault may be a SnapVault™ type persistent storage device.

Regardless of the particular configuration, the applications 604 and 606, and/or the operating system 602 may request and require dynamic images of a storage object of the storage system 608 (e.g., part of a file system, logical unit, etc.). Preferably, such image requests are passed and/or handled by the application 604. The requests are further preferably passed to the storage system 608, which presents images in response to the requests. Preferably, the storage system 608 employs the methods described above. Moreover, the storage system 608 is configured to delete/destroy the images as needed, and/or to archive the images in a persistent manner, by using the vault device 610.

Removing Image and Clone Dependency

In some embodiments, images and/or clones that are no longer needed are deleted, thereby resulting in greater efficiency and storage savings. In some embodiments, unneeded images and/or clones may be deleted by removing dependencies between produced images and clones. Typically, a dependency exists between a clone (or an image of a clone) and its backing image is based on the reference to the backing image contained in the clone (or in image of a clone) as well as a reference counter contained in the backing image. When a clone (or an image of a clone) is preceded by multiple images and/or clones, the clone or the image of the clone may also contain a reference to each preceding clone and/or image. Moreover, a referenced backing image may include a reference counter that indicates the number of clones and/or images of clones that reference the backing image. When the reference counter of a backing image is greater than zero, the backing image is locked to prevent deletion of the backing image, thereby preventing "inconsistent" clones or images of clones (i.e., clones or images of clones that do not have a backing image). In some embodiments, the dependency between clones and backing images may be removed so that unneeded clones and/or images may be unlocked and deleted. Thus, clones and/or images that are no longer required to be stored may be deleted, resulting in greater efficiency and storage savings.

Conventionally, there exists an image dependency that prevents the base image that is backing a logical unit clone, from being deleted unless all its younger images (i.e., prior generated images), which contain a copy of the logical unit clone, are deleted first. Some embodiments advantageously remove the image dependency between the backing image and the other images when the logical unit clone is deleted from the active file system. Embodiments of the invention preferably enable deletion of the base image without first having to delete the other images that contain a copy of the logical unit clone. For example:

| LUN | LUN_CLONE | (Delete LUN_CLONE) |
|-----|-----------|---------------------|
| S0 (LUN) | S1 (LUN, LUN_CLONE) | S2 (LUN) |

In this example, the image S1 has a dependency on the base image S0, because its copy of LUN_CLONE is backed by S0. As a result, conventionally, the image S0 cannot be deleted unless the image S1 is deleted first. Implementations of the invention advantageously remove this dependency to allow deletion of the image S0.

As mentioned above, conventional clones have an image dependency on a prior backing image that imposes certain undesirable requirements. For instance, since the time between the generation of the images VSS_Snapshot_X_initial and VSS_Snapshot_X_final is effectively unbounded (i.e., does not have a predetermined limit), it is preferable to allow additional image generation and/or cloning during this variable time period. An image such as "random_snapshot_A" that is generated between the two images, initial and final, contains a copy of the image-backed logical unit that preferably does not depend on the original image VSS_Snapshot_X_initial. Otherwise, "random_snapshot_A" is only consistent if VSS_Snapshot_X_initial exists. As mentioned, the dependency incurs certain disadvantages. For instance, in the following sequence of images the image dependencies become unmanageable:

VSS_Snapshot_X_initial,
VSS_Snapshot_Y_initial,
VSS_Snapshot_X_final,
VSS_Snapshot_Y_final.

As recognized by one of ordinary skill, the image VSS_Snapshot_X_initial has a dependency on the image VSS_Snapshot_Y_initial, which has a dependency on VSS_Snapshot_X_final, which has a dependency on VSS_Snapshot_Y_final. Typically, there are hundreds of such mixed pair snapshots that reside between a prior image VSS_Snapshot_X_initial and a later image VSS_Snapshot_Xfinal. Hence, it is unmanageable to keep track of the relation of the various generated images to one another. As another example, due to the reasons discussed above, the dependencies are similarly unmanageable for the sequence:

VSS_Snapshot_X_initial,
VSS_Snapshot_Y_initial,
VSS_Snapshot_Y_final,
VSS_Snapshot_X_final.

Another drawback of image dependence is the potential for inconsistencies. Generally, it is difficult to preserve the logical unit clone in an image without preserving its base (or "backing") image. The logical unit clones in newer images may become inconsistent because traditionally, the base image can be deleted. This problem of potential inconsistency is avoided in some embodiments by using various attributes of images such as "refcount" (reference count) and image locking Refcount tracks the number of references or dependencies for the image, while image locking prevents undesirable and/or premature deletion of the image. More specifically, the following is an example of the operation of some implementations.

```
    LUN   LUN_CLONE_0 LUN_CLONE_0_F
------|----|----|-----|----------------->
      S0   S1   S2    Sf
```

In this implementation, a logical unit clone, "LUN_CLONE_0" is backed by an image S0. When LUN_CLONE_0 is first generated, a refcount is taken against S0. Subsequent images S1, S2 . . . Sf advantageously do not result in additional refcounts being taken against S0. If LUN_CLONE_0 is deleted, the refcount may be reduced to zero and S0 is preferably deleted without having to delete any of the newer images first. When the logical unit clone "LUN_CLONE_0_F" is generated, a refcount will be taken against S0 and Sf. The logical unit clone is backed by both S0 and Sf, and both images S0 and Sf are locked. The images S0 and Sf cannot be deleted without LUN_CLONE_0_F, being deleted first. This is also known as logical unit clone chaining (i.e., repeatedly producing a clone of a clone).

When LUN_CLONE_0_F is deleted, the deletion decrements the refcount on each of the images Sf and S0. Once the image S0 is deleted, any attempt to create a new logical unit clone from the images S1, S2, and/or Sf that is backed by the image S0, will result in an error. The foregoing becomes complicated quickly with logical unit clone chaining, for example, a clone of a clone of a clone, with each clone backed by its respective images, which is backed by its older images, which is backed by the initial oldest image.

As mentioned above, embodiments of the invention allow advantageous removal of dependencies between the images backing a logical unit number. These images further preferably include virtual disks or clones, of the generated images. The following provides a background description of the relationship between logical unit number(s), clones, images, and/or Snapshots™.

Conventionally, an image may be locked if there is a reference such as a "snapref" against that image. A snapref increases the reference count for the image. A clone of the image may be implemented by using a virtual disk that also maintains its own parallel attribute "snapref_vdisk" for storing refcounts in the same image structure. A virtual disk (clone) management subsystem takes and releases both of these refcounts (snapref and snapref_vdisk) atomically. Preferably, the clone management subsystem (not shown in FIGS. 1-6) is implemented as a component of the storage system (or filer) to manage (generate, store, retrieve, and/or remove) the generated virtual disks (i.e., the clones). The virtual disk (vdisk) subsystem takes an additional refcount against the backing image whenever a new image, which contains a copy of the logical unit clone, is created. The vdisk subsystem uses the attribute snapref_vdisk for storing a refcount, to prevent undesirable deletion of the backing image and to track backing image dependency. In some cases, using the snapref_vdisk attribute is redundant as in the case of the snap auto-delete function, because the /snapref/attribute automatically also prevents the snap auto-delete function from deleting the image.

The following describes in further detail how some embodiments generate and/or delete refcount for a virtual disk clone. When a new logical unit clone is generated, the storage system (filer) increments both the snapref and snapref_vdisk refcounts, updates a volume table of contents (vtoc) entry with the backing image identifier (e.g., snapid) in the corresponding image vtoc metafile, and then flushes it to disk. Preferably, this occurs within the same consistency point (CP). A vtoc metafile stores records of a virtual disk (VDISK) within a storage system/filer's volume. The vtoc metafile is where the storage system looks up information regarding an implemented virtual disk (VDISK) when the storage system/filer comes online, or during mounting of the file system and/or virtual disk. A consistency point (CP) is a time at which data is written to disk. Any subsequent image generation will result in an additional refcount taken against the backing image. When the logical unit clone is destroyed, the reverse occurs if there is no other image that contains a copy of the logical unit clone. Otherwise, the system leaves the vtoc entry intact and only releases its instance of snapref and snapref_vdisk. These refcounts are not persistent and the counts are computed on mount. During mount (such as when the storage system starts up), the storage system loads the vtoc metafile for each image and traverses and/or "walks" each vtoc entry looking for the existence of a logical unit clone. The storage system takes a refcount against the corresponding backing image if it finds a logical unit clone.

Some embodiments remove the dependency and further advantageously allow deletion of an image pair and without the deletion of intervening images. For instance, some embodiments delete the base image of an image-backed logical unit without removing the images that contain the image-backed logical unit. Specific embodiments handle input/output (IO) to the logical unit after a dependency on a base image and/or the base image itself is deleted. One implementation leaves the logical unit in place and/or stored without deletion, but then advantageously employs an exception handling mechanism to fail input/output to the logical unit. This implementation ensures that anything that can access the logical unit will handle input/output errors.

Rather than locking the initial base image whenever there is a newer image taken that contains a copy of the logical unit clone (that refers to the base image), some embodiments lock the base image during logical unit clone registration. In the case of clone chaining (producing a clone of a clone), these embodiments also lock down the intermediate backing images. No additional new lock is taken against the backing images on subsequent image generation. The lock(s) are preferably released when the logical unit clone is unregistered. New logical unit clone registration results in an error if any of the new clone's backing images are missing. This advantageously prevents users and/or applications from creating new logical unit clones from an inconsistent logical unit clone in an image. The logical unit clone in an image typically becomes inconsistent when one of its backing images is deleted.

Identifying and Validating a Backing Image

In order to remove dependencies, embodiments of the invention may identify and/or validate backing image(s). For instance, each logical unit has an associated "stream" that includes the logical unit's image and/or clone attribute data. Accordingly, each logical unit clone will have image attributes that describe its backing image. To identify backing image(s) for a logical unit clone, some implementations traverse and/or walk the logical unit's associated stream data until the base image is located. The stream from the base image does not typically have any image attributes since it is a regular logical unit, and not a clone or image of a clone. Particularly useful logical unit clone attributes include: clone_split_style type attributes, and image and/or Snapshot™ type attributes, such as backing clone "snapid," backing clone "fileid," backing clone generation information, "snapshot_path_last," and/or backing clone name, for example. Once backing images are identified and/or validated, they may require locking and/or unlocking, which is further described below.

Some implementations include an assumption in the foregoing image validation code that the backing images are already locked down. Therefore, these implementations validate only the current or most recent backing image. In alternative implementations, however, the backing image is not locked down until the logical unit clone is registered. Hence, these alternative implementations enhance the image validation code such that the backing images are validated regardless of the age of the images.

In some embodiments, potential backing images may be locked during mount and at various other times, for example, during consistency point, logical unit rescan, and/or image restore. Image restore, consistency point, and mounting of a logical unit are discussed above. A logical unit scan and/or rescan may be used to identify logical unit(s) for mounting. The locking may occur regardless of whether or not the logical unit is active or used. Conventionally, the base image is unlocked if all its younger images are first deleted. An image is younger when it is more recently generated than another image. With certain embodiments, existing image locking code paths are disabled and the required backing images are locked, selectively and/or on-demand. This may be advantageously performed at a single place during virtual disk (clone) registration. The lock may then be selectively released when the virtual disk (clone) is unregistered. Further, special cases may be required for image restore (e.g., SnapRestore™ provided by Network Appliance, Inc.).

Image locking is useful to prevent image and/or clone inconsistencies. Typically, a logical unit clone becomes inconsistent the moment one of its backing images is deleted. For instance, a function may delete an image including a base image that is backing a clone. Then, an inconsistent logical unit clone may undesirably appear within the active file system via certain commands and/or operations such as "volume image" and/or SnapRestore™. Typically, the active file system is the file system that is being used by the operating system, compared to a stored or archived file system that is captured by and image. Some embodiments destroy these inconsistent logical unit clones from the active file system during mount. Moreover, attempts to generate a new logical unit clone by using an existing inconsistent logical unit clone within an image, preferably results in notification of an error.

Preferably, read and/or write (input/output) for the clone (or VDISK) passes through the traditional WAFL_READ and WAFL_WRITE interfaces. When the VDISK inode is first loaded, it initializes its block function pointer, which tells the file system from where to load the blocks, when reading or writing data to an image-backed VDISK (or logical unit clone). If backing images are missing, a logical unit clone is inconsistent and certain implementations preferably ensure that the applications that are sensitive to the consistency of the data are handled. On a mount, as described above, inconsistent logical unit clones are preferably deleted from the active file system. Thus, some embodiments advantageously regulate access to inconsistent logical unit clones in images, and not other inconsistent logical unit clones, that are likely to be deleted on mount.

Inconsistent logical unit clones may not be marked for shared read access (/lun share/) by other protocols, and may not be exported. Moreover, since inconsistent logical unit clones may not be exported, some embodiments control the read-only access to such inconsistent logical unit clones via NFS/CIFS. Some of these embodiments advantageously control access in the following manner: "LOOKUP" access may be permitted. "READ" access, ISCSI and/or VDISK (clone) administration are allowed, and if shared read access is enabled, read access is preferably allowed. Applications are preferably made aware of inconsistent logical unit clones. Such applications include, for example, QSM, NDMP, and/or VDISK administration.

File system logical unit commands preferably depend on VDISK (clone) registration code paths to verify, lock, and/or unlock images. Restore such as an image restore (e.g., SnapRestore™) may preferably also be handled by the VDISK (clone) registration code path, with provisions for special cases. Advantageously, inconsistent logical unit clones that are brought back from the image by restore are deleted from the active file system. Hence, an inconsistent logical unit clone is preferably not permitted to reside within the active file system. For instance, on each mount, if an inconsistent logical unit clone is detected within the active file system, the inconsistent logical unit is advantageously deleted (i.e., the backing image is deleted). However, some implementations change particular system modules, for example, at the SnapDrive™ and the VSS level. More specifically, these modules may make additional requests to the file system for the extra images and logical unit clone activities described above. These modules further preferably ensure that image and logical unit clone generation and/or deletion occur in a proper order.

Example of a New Logical Unit Clone

In the following example, a new image backed logical unit "lun_s1" is generated from the logical unit "lun" in the image "snap1." The "lun show" command shows that "lun_s1" is backed by the image "snap1." Running the snap list command shows that "snap1" is busy (busy,LUNs), as expected. Then, a new image and/or Snapshot™ may advantageously be generated. When a new image "snap2" is generated, the new image contains a copy of "lun_s1," which is still backed by the logical unit "lun" in the image "snap1". Running the "lun snap usage" command on "snap2" shows this backing-image dependency.

An indication that an image is busy means that the image is currently in-use or is locked down by an application. An image is preferably locked down at various times to prevent a second application from undesirably destroying the image while a first application is still using the image.

Further, the generated static image may advantageously be destroyed, and the dependencies removed. Destroying the logical unit clone "lun_s1" from the active file system effectively removes the dependency. Running the "lun snap usage" command shows that "snap2" still has a dependency on "snap1." Running the "snap list" command now reports that "snap1" is no longer a (busy,LUNs) image, as expected. Because "snap1" is no longer in the state (busy,LUNs), it is advantageously deleted without requiring "snap2" to be deleted first. As mentioned, certain implementations provide for validating a backing image or Snapshot™. More specifically, once the image "snap1" has been deleted, an attempt to clone a logical unit in the image "snap2" that was backed by the image "snap1" will not be permitted. Preferably, an error message is used in implementation, to notify the user in these cases.

Embodiments described above advantageously handle image and/or (clone) dependency. For instance, the base image is optionally deleted once the logical unit clone is deleted from the active file system without requiring another image that contains a copy of the logical unit clone, to be deleted first. Some embodiments handle image dependency across volume cloning by using an image-based logical unit. Some of these embodiments support logical unit read/write and/or input/output without an initial base image, and further support lun-type commands, snap-type commands, and other related or affected commands. Implementations of the invention preferably operate in conjunction with a volume restore and/or another type of restore. Further, some embodiments include test and/or verification feature(s). Preferably, logical units, clones, and images thereof, are implemented by using virtual disks (VDISK).

Certain embodiments support ZAPI calls also provided by Network Appliance, Inc. ZAPI is a set of libraries and interfaces that are used to execute a set of requests on a storage system. Some embodiments include a new volume option referred to here as "snapshot-clone-dependency." These embodiments provide on-disk change to distinguish different styles of image locking. Typically, a revert-type operation clears the dependency option. Still, some implementations preserve image reference policy across an upgrade and/or revert operation. The "volume-image-restore" function preferably restores the state of the option in the image. Moreover, ZAPI calls to set and/or unset the volume option includes the dependency and/or locking options. The logical unit clones and images that are generated by using traditional methods advantageously revert to a conventional image locking mechanism irrespective of whether the volume option is on/off.

Further, the operations of the operating system of the server system are captured in the image or Snapshot™ stream, and are further captured and/or mirrored automatically by various mirroring products (such as SnapMirror™ provided by Network Appliance, Inc.). Such mirroring may be implemented in conjunction with the system of FIG. 6 described above. Moreover, since data are contained within the volume, the processes 400 and 500, and the additional advantageous steps described above require no special modifications for mirroring, dump, and the like, to access data stored elsewhere, such as for aggregated data. Also, the processes and steps discussed above are applicable to traditional volumes.

Advantageously, there is no longer a need to load the vtoc metafile and vtoc entries when the storage system looks for potential backing images during mount and consistency point (CP). This reduces latency when performing the extra disk input/output (IO). Reducing the latency on the mount path improves the scalability of the virtual disk (clone), and shortening the consistency points (CPs) help the time allotted for volume shadow service image of some implementations. Some implementations are integrated into SnapDrive™, the volume shadow service, the file system such as in WAFL®, and/or a dump operation (i.e., a function that automatically gathers and stores information upon a system crash). Regarding the dump operation, for instance, there are three or more ways to handle the interaction between volume shadow service and a dump operation: (1) abort the dump if a logical unit clone becomes inconsistent while the dump is running; (2) write invalid data, zeros, or a truncated file for the inconsistent logical unit clone; (3) the dump operation locks the images on which it is dependent so that the logical unit clones may not become inconsistent. In the third case, logical unit clones that are inconsistent in the image when the dump operation starts are preferably not included in the dump.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these embodiments of the invention have been described, the invention should not be limited to these embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or systems.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems' registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for managing images of a storage object, the system comprising:
   a computer system including a processor and memory, the computer system configured for:
   generating a first image of the storage object;
   receiving new data relating to changes to the storage object occurring after the first image is generated;
   generating a first clone comprising a reference to the first image and the new data;
   generating a second image of the first clone; and
   deleting the first clone and the first image without first deleting the second image, the first image comprising a backing image of the first clone and the second image whereby a dependency exists between the first clone and the first image and a dependency exists between the second image and the first image based on the reference to the first image contained in the first clone, wherein:
   the first image comprises an associated reference counter, the first image being locked from deletion if the reference counter is greater than zero;
   the reference counter of the first image is incremented upon generating the first clone;
   the reference counter of the first image is not incremented upon generating the second image; and
   deleting the first clone decrements the reference counter of the first image to zero, whereby the first image is unlocked from deletion and allows the first image to be deleted without deleting the second image.

2. The system of claim 1, wherein:
   deleting the first clone and the first image comprises deleting the first clone before deleting the first image for removing the dependency between the first clone and the first image.

3. The system of claim 2, wherein the computer system is further configured for:
   after deleting the first clone, removing the dependency between the second image and the first image to allow deleting of the first image without first deleting the second image.

4. A non-transitory computer readable storage medium having instructions stored thereon when executed, manage images of a storage object, the computer readable storage medium comprising sets of instructions for:
   generating a first image of the storage object;
   receiving new data relating to changes to the storage object occurring after the first image is generated;
   generating a first clone comprising a reference to the first image and the new data;
   generating a second image of the first clone; and
   deleting the first clone and the first image without first deleting the second image, the first image comprising a backing image of the first clone and the second image whereby a dependency exists between the first clone and the first image and a dependency exists between the second image and the first image based on the reference to the first image contained in the first clone, wherein:
   the first image comprises an associated reference counter, the first image being locked from deletion if the reference counter is greater than zero;
   the reference counter of the first image is incremented upon generating the first clone:
   the reference counter of the first image is not incremented upon generating the second image; and
   deleting the first clone decrements the reference counter of the first image to zero, whereby the first image is unlocked from deletion and allows the first image to be deleted without first deleting the second image.

5. The computer readable storage medium of claim 4, wherein:
   deleting the first clone and the first image comprises deleting the first clone before deleting the first image for removing the dependency between the first clone and the first image.

6. The computer readable storage medium of claim 5, further comprising sets of instructions for:
   after deleting the first clone, removing the dependency between the second image and the first image to allow deleting of the first image without first deleting the second image.

7. A method for managing images of a storage object, the method comprising:
   generating, by using a computer, a first image of the storage object;
   receiving new data relating to changes to the storage object occurring after the first image is generated;
   generating a first clone comprising a reference to the first image and the new data;
   generating a second image of the first clone; and
   deleting the first clone and the first image without first deleting the second image, the first image comprising a backing image of the first clone and the second image whereby a dependency exists between the first clone and the first image and a dependency exists between the second image and the first image based on the reference to the first image contained in the first clone, wherein:
   the first image comprises an associated reference counter, the first image being locked from deletion if the reference counter is greater than zero;
   the reference counter of the first image is incremented upon generating the first clone;
   the reference counter of the first image is not incremented upon generating the second image; and
   deleting the first clone decrements the reference counter of the first image to zero, whereby the first image is unlocked from deletion and allows the first image to be deleted without first deleting the second image.

8. The method of claim 7, wherein:
   deleting the first clone and the first image comprises deleting the first clone before deleting the first image for removing the dependency between the first clone and the first image.

9. The method of claim 8, further comprising:
   after deleting the first clone, removing the dependency between the second image and the first image to allow deleting of the first image without first deleting the second image.

* * * * *